(12) United States Patent
Basche et al.

(10) Patent No.: US 7,361,854 B2
(45) Date of Patent: Apr. 22, 2008

(54) OPERATING ELEMENT FOR A MULTI-MEDIA SYSTEM IN A MOTOR VEHICLE

(75) Inventors: Boris Basche, Bernhardswald (DE);
Volker Erben, Regensburg (DE);
Roland Falkner, Schnaittach (DE);
Klaus Hasemann, Regensburg (DE);
Reinhard Haubner, Kelheim (DE);
Daniel Hostmann, Regensburg (DE);
Gerhard Lex, Neutraubling (DE); Nhu Nguyen Thien, Regensburg (DE);
Oliver Pichl, Baierdorf-Hagenau (DE);
Richard Scherl, Lappersdorf (DE);
Elmar Weber, Mitterfecking (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/570,915

(22) PCT Filed: Jun. 23, 2004

(86) PCT No.: PCT/EP2004/051584

§ 371 (c)(1),
(2), (4) Date: Feb. 8, 2007

(87) PCT Pub. No.: WO2005/024540

PCT Pub. Date: Mar. 17, 2005

(65) Prior Publication Data

US 2007/0159452 A1      Jul. 12, 2007

(30) Foreign Application Priority Data

Sep. 3, 2003    (DE) .............................. 103 41 016

(51) Int. Cl.
*H01H 25/06* (2006.01)
(52) U.S. Cl. ....................................................... 200/18
(58) Field of Classification Search ..................... None
See application file for complete search history.

(56) References Cited

U.S. PATENT DOCUMENTS 5,270,689 A    12/1993    Hermann (Continued)

FOREIGN PATENT DOCUMENTS

| DE | 38 36 555  | 5/1990 |
| DE | 197 30 297 | 1/1999 |
| DE | 199 47 529 | 5/2000 |
| DE | 200 14 425 | 2/2001 |
| DE | 101 20 691 | 11/2002 |

OTHER PUBLICATIONS

International Search Report dated Jun. 13, 2006 issued in corresponding application PCT/EP2004/051584.

*Primary Examiner*—Renee S. Luebke
(74) *Attorney, Agent, or Firm*—Cohen Pontani Lieberman & Pavane LLP

(57) ABSTRACT

The invention relates to a rotating actuator/pressure actuator (13) comprising a ring-shaped rotary transducer (5) consisting of an inner ring and a rotary ring with a handle (1) and which can rotate around the inner ring about an axis (z) and which is displaceably arranged in a linear manner along the axis (Z) in relation to a housing (11), in addition to an inner part (touchpad 2) which is arranged in an inner area (12) of the ring-shaped rotary transducer (5) and which is displaceable in a linear manner along the axis (z) together with the ring-shaped rotary transducer (5) in relation to the housing (11). Linear displacement of the handle (1) and/or inner part (touchpad 2) triggers a push-button function. According to the invention, the rotary transducer (5) and inner part (touchpad 2) are arranged in a pan-shaped guide element (7) which is arranged in a linear displaceable manner along the axis (z) in the housing; the inner ring of the rotary transducer (5) is rotationally fixed in the guide element (7); the rotary transducer (5) and the inner par (touchpad 2) are connected to the guide element (7) in such a way that they are not displaceable along the axis (z) and the guide element (7) acts upon the push button (9).

9 Claims, 2 Drawing Sheets

U.S. PATENT DOCUMENTS

| | | |
|---|---|---|
| 6,100,476 A | 8/2000 | Adamietz et al. |
| 6,555,770 B2 * | 4/2003 | Kawase ................ 200/18 |
| 6,636,197 B1 | 10/2003 | Goldenberg et al. |
| 7,091,430 B1 * | 8/2006 | Haizima et al. ........... 200/4 |
| 2004/0031667 A1 * | 2/2004 | Dinkel et al. ............ 200/5 A |
| 2004/0032395 A1 | 2/2004 | Goldenberg et al. |
| 2004/0132498 A1 | 7/2004 | Clabunde et al. |
| 2006/0012584 A1 | 1/2006 | Vassallo et al. |

* cited by examiner

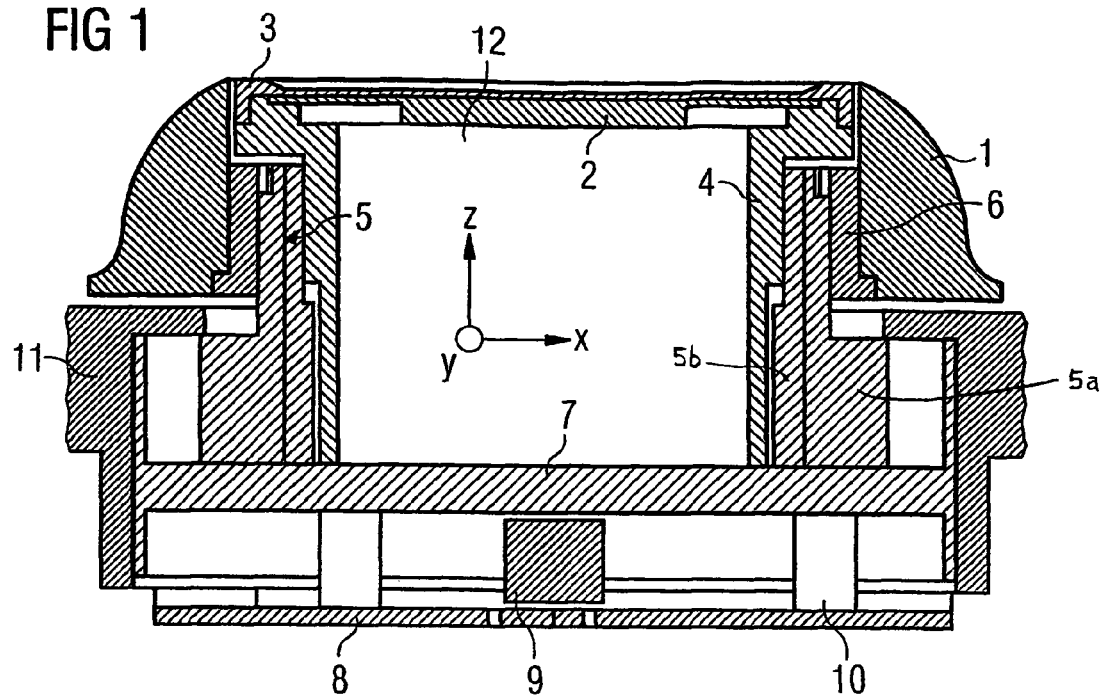
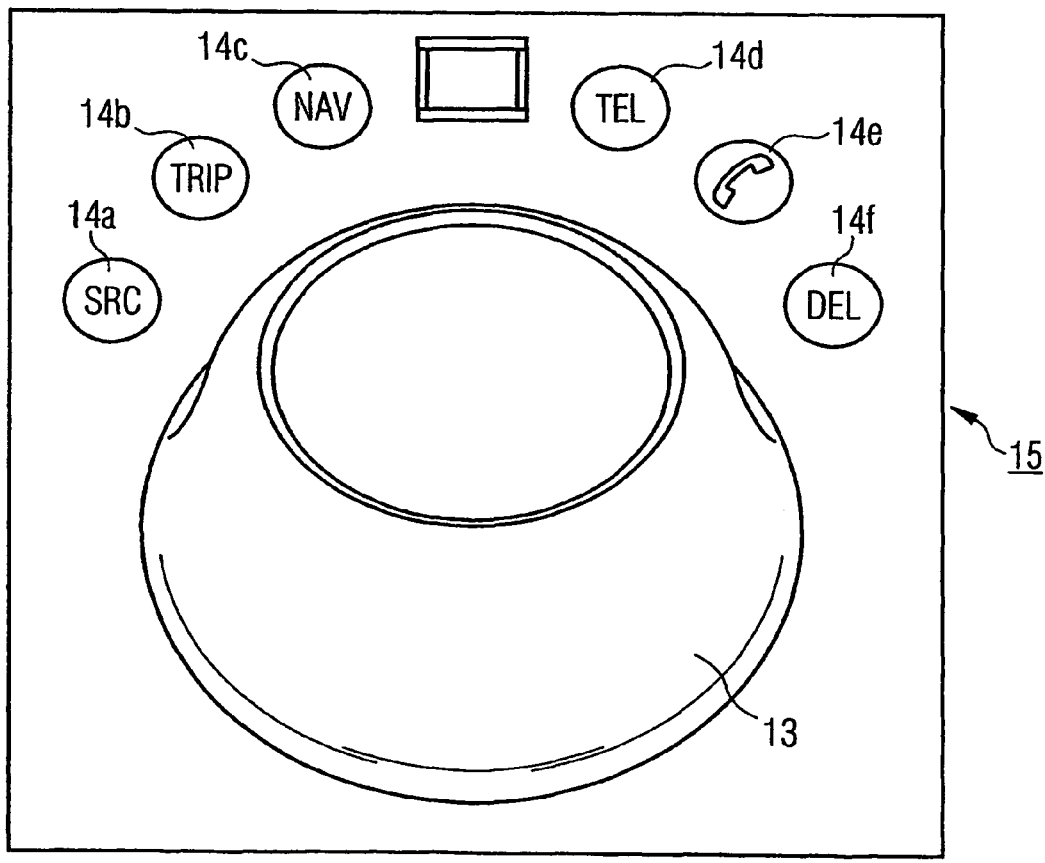

OPERATING ELEMENT FOR A MULTI-MEDIA SYSTEM IN A MOTOR VEHICLE

CROSS REFERENCE TO RELATED APPLICATIONS

This is a U.S. national stage of application No. PCT/EP2004/0051584, filed on Jul. 23, 2004. Priority is claimed on the following application: Country: Germany, Application No.: 103 41 016.3, Filed: Sep. 3, 2003.

BACKGROUND OF THE INVENTION

The invention relates to a rotary/pushbutton actuator having an annular rotary encoder which has an inner ring and a rotary ring, which can be rotated about an axis around the inner ring and has a dial, and is arranged such that it can be moved linearly with respect to a housing along the axis, and having an inner part which is arranged in an interior space in the annular rotary encoder and can be moved together with the annular rotary encoder with respect to the housing linearly along the axis, it being possible to initiate a momentary-contact function by linearly moving the dial and/or the inner part.

An operator control element of this type is known from U.S. Published Patent Application 2004/132498. This known operator control element can be rotated about an axis and can be moved along this axis of rotation and can be locked in a position on this axis. A ring encoder, which has an inner ring and an outer ring which can be rotated with respect to the inner ring, is provided for the purpose of detecting the rotary movement. A touch pad which enables a cursor to move on a display or allows text to be recognized may be arranged in the free interior space in the ring encoder. A joystick which detects a movement in an X-Y plane as a result of tilting and outputs corresponding electrical signals is arranged in the operator control element. The joystick is also in the form of a momentary-contact switch which detects a movement of the holder as a result of the operator control element being pressed. The design of the operator control element specified in U.S. Published Patent Application 2004/132498 has proven to be very complicated.

SUMMARY OF THE INVENTION

An object of the invention is therefore to specify an operator control element for a multimedia or navigation system in a motor vehicle, which operator control element is of a simplified and therefore more cost-effective design than the prior art.

According to the invention, the object is achieved with a rotary/pushbutton actuator of this generic type in that the rotary encoder and the inner part are arranged in a pot-like guide element which can be moved linearly along the axis, the inner ring of the rotary encoder is arranged in the guide element such that it is secured in terms of rotation, the rotary encoder and the inner part are connected to the guide element such that they cannot move along the axis, and the guide element for implementing the momentary-contact function acts on the momentary-contact switch.

Arranging the rotary encoder and the inner part in a movable pot-like guide element means that a momentary-contact switch on which the guide element acts can be used for the momentary-contact function in a simple manner. In order to ensure that the operator control element is arranged in an extension of an armrest of a vehicle seat in an ergonomically favorable fashion, the diameter of the dial may be designed as a function of the geometry/dimensions of the touch pad, for example between 40 and 100 mm. The use of the annular rotary encoder is provided in order to satisfy the requirement of integrating a further functional element, in particular a touch pad, in the inner part. The set requirement cannot be satisfied by rotary encoders with a central rotary shaft inside. The rotary encoder may, in particular, be designed as a so-called ring encoder. Ring encoders of this type do not themselves have any pushbutton function in order to be able to subject a momentary-contact switch to operator control. In order to implement a pushbutton function, the assembly comprising the rotary encoder and the touch pad is inserted into a pot-like guide element. This guide element is mounted in the housing such that it can move along the axis, and can operate a momentary-contact switch which is arranged beneath the guide element. A restoring force is exerted on the guide element by at least one restoring element and the guide element is moved to a rest position. The use of the pot-like guide element means it is possible to implement a pushbutton function with different types of rotary encoders.

The operator control element is intended to be used in a motor vehicle for the operator control of a multimedia or navigation system in particular. In this case, a menu item can be called up, for example, by turning the operator control element and then selected by pressing the operator control element. In addition, the operator control element can be used to select numbers or letters which are displayed on a display unit which is arranged separately from the operator control element. In this way, a telephone number or the name of a town or street, for example, can be entered.

The touch pad can also be used to control a menu. For example, a cursor on the display unit can be moved by moving a finger over the touch pad. The menu item which is called up can then be selected by pressing the operator control element. The touch pad can also be used to recognize handwritten numbers or letters which are entered. In this way, a telephone number or a name can be entered in a particularly simple manner. It is particularly advantageous when the entered letter or the entered number is audibly reproduced by the device which is subjected to operator control by means of the operator control element. The driver then receives immediate confirmation about the entered symbols without having to look at the display unit and being distracted from the traffic. When used in a navigation system for entering a destination, the destination location can furthermore be audibly output even after a few letters have been entered if the sequence of letters can be unambiguously associated with one single destination location. It is therefore not necessary to enter the complete name of the town.

The operator control element is preferably a constituent part of an operator control unit which contains further components. Arranging the operator control unit in an extension of an armrest of a driver's seat is particularly favorable in ergonomic terms. In this case, a plurality of operator control keys is arranged, in particular, radially around the rotary/pushbutton actuator. In this case, the operator control keys may be operator control keys which can be used to directly call up individual components, for example a telephone component or a navigation component.

BRIEF DESCRIPTION OF THE DRAWINGS

The invention is explained in greater detail in the text which follows with reference to an exemplary embodiment and the drawing, in which:

FIG. 1 is a cross-sectional view of the operator control element according to the present invention, FIG. 2 is a perspective view of an operator control unit with the operator control element of FIG. 1.

DETAILED DESCRIPTION OF THE PRESENTLY PREFERRED EMBODIMENTS

Figure 3:
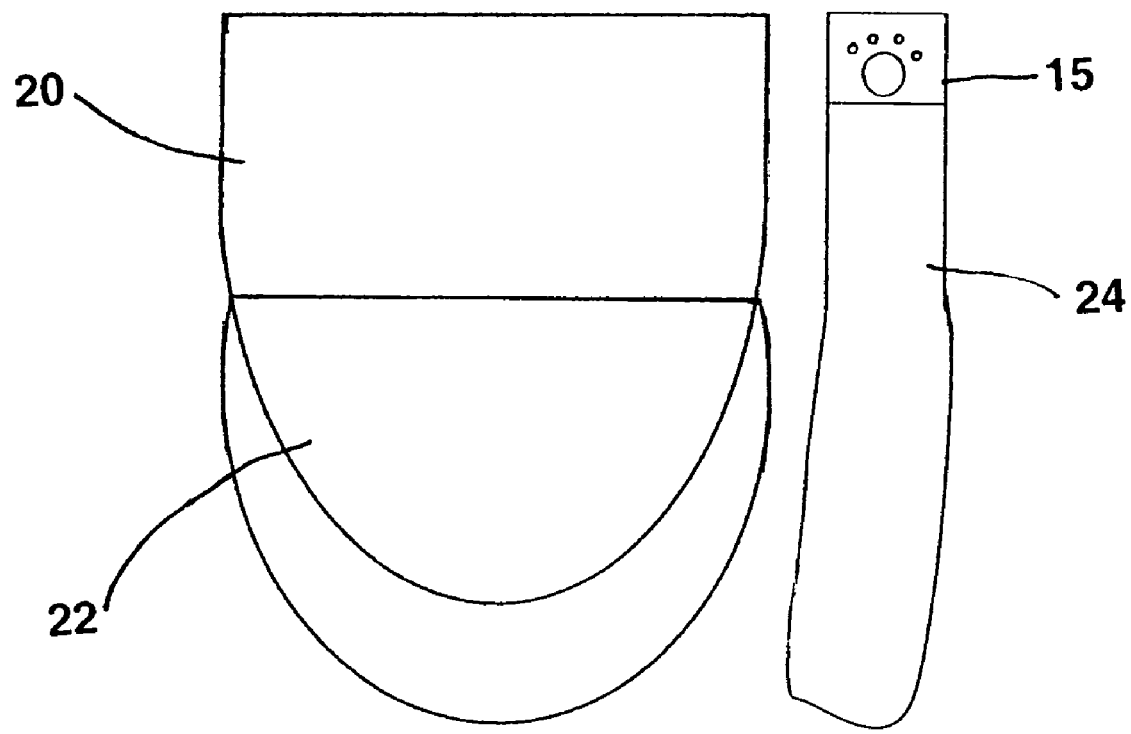
FIG. 3 is a top view of a vehicle seat having the operator control unit of FIG. 2.

As shown in FIG. 1, the operator control element has a dial 1 which is locked to the rotary ring 5a of a rotary encoder 5 by means of a spacer ring 6. The rotary encoder 5 is a ring encoder which has a rotary ring which can be rotated about an inner ring 5b. Ring encoders of this type are known per se. Therefore, the inner ring and the rotary ring 5a are illustrated only schematically in the drawing. Rotation is transmitted to the rotary ring of the rotary encoder 5 by turning the dial 1 about the Z-axis.

A holding cylinder 4 is pressed into the stationary inner region 5b of the rotary encoder 5 by means of centering webs. A touch pad 2 which is secured by a retaining ring 3 is arranged in the upper region of the holding cylinder 4. This arrangement determines the position of the touch pad, with the touch pad 2 not moving with the dial 1 when said dial is turned. The use of an annular rotary encoder 5 ensures the required free interior space 12 for arranging the touch pad 2.

The dial 1 with the spacer ring 6, and the touch pad 2 with the holding cylinder 4 and the retaining ring 3 are fitted on the rotary encoder 5 and form an assembly together with said rotary encoder.

The rotary encoder 5 is screwed into a pot-like guide element 7. The guide element 7 is guided in a housing 11 by means of a cylindrical holder. The entire assembly can therefore be moved in the Z-direction. The guide element 7 is secured in terms of rotation about the Z-axis with respect to the housing. A printed circuit board 8 which is screwed to the housing 11 is arranged beneath the guide element 7. A momentary-contact switch 9 is fitted in the center of the printed circuit board 8. The guide element 7 with the abovementioned assembly therefore functions in the manner of a simple rotary knob which acts on the momentary-contact switch 9. The entire assembly is pressed in the Z-direction to a zero position against a housing stop by means of a restoring element 10 between the printed circuit board 8 and the guide element 7.

When force is exerted on the dial 1 or the touch pad 2 in the negative Z-direction, the entire assembly which is arranged in the guide element 7 moves in the negative Z-direction toward the momentary-contact switch 9 and acts on the latter. In this case, the force of the restoring element 10 is overcome and the momentary-contact switch 9 executes a switching operation. After force is exerted, the guide element 7 is again returned to its initial position by the force of the restoring element 10.

The operator controller can therefore execute the following movements of the operator control element:

a move in the negative Z-direction as a result of being pressed, automatic return in the Z-direction on account of restoring element 10, continuous rotation through 360° about the Z-axis.

During these movements of the operator control element, the touch pad is also moved in the Z-direction, whereas the touch pad does not move when said operator control element is rotated about the Z-axis.

FIG. 2 shows the arrangement of a rotary/pushbutton actuator 13 according to the invention in an operator control unit 15 which, in addition to the rotary/pushbutton actuator 13, has further operator control keys 14a-14f which are arranged radially around the rotary/pushbutton actuator 13. The rotary/pushbutton actuator 13 has a diameter of 40 to 100 mm, so that a driver can comfortably grasp it by hand. When a hand is positioned on the rotary/pushbutton actuator, the driver's fingers can reach the radially arranged operator control keys 14a-14f in an ergonomically favorable manner.

FIG. 3 shows a vehicle seat having a supporting platform 20, a back rest 22 and an armrest 24. The operator control unit 15 is arranged on an extension of the armrest 24.

The invention claimed is:

1. A rotary/pushbutton actuator, comprising:

a housing;

a pot-shaped guide element arranged in said housing;

an annular rotary encoder having an inner ring and a rotary ring arranged in said pot-shaped guide element and defining an interior space, said rotary ring being rotatable about an axis of rotation and having a dial, said inner ring being arranged on said pot-shaped guide element so that said inner ring is fixed with respect to rotation relative to said pot-shaped guide element, said pot-shaped guide element and said annular rotary encoder being movable together linearly in a direction of said axis of rotation;

an inner part arranged in said interior space and movable with the annular rotary encoder in the direction of said axis of rotation relative to said housing; and a momentary contact switch arranged in said housing and actuatable by said pot-shaped guide element in response to movement of at least one of said dial or said inner part in the direction of said axis of rotation.

2. The actuator of claim 1, further comprising at least one restoring element acting on said pot-shaped guide element for urging said pot-shaped guide element to a non-actuated position.

3. The actuator of claim 1, further comprising a printed circuit board extending essentially perpendicular to said axis of rotation, wherein said momentary contact switch is arranged on said printed circuit board, and said guide element has a base area extending parallel to said printed circuit board and acting on said momentary contact switch.

4. The actuator of claim 1, wherein said inner part further comprises a touch pad.

5. The actuator of claim 4, wherein said inner part comprises a holding cylinder holding said touch pad and connected in said interior space so that said inner part is fixed with respect to rotation relative to said inner ring of said annular rotary encoder.

6. An operator control unit comprising a rotary/pushbutton actuator, wherein said rotary/pushbutton actuator comprises:

a housing;

a pot-shaped guide element arranged in said housing;

an annular rotary encoder having an inner ring and a rotary ring arranged in said pot-shaped guide element and defining an interior space, said rotary ring being rotatable about an axis of rotation and having a dial, said inner ring being arranged on said pot-shaped guide element so that said inner ring is fixed with respect to rotation relative to said pot-shaped guide element, said pot-shaped guide element and said annular rotary encoder being movable together linearly in a direction of said axis of rotation;

an inner part arranged in said interior space and movable with the annular rotary encoder in the direction of said axis of rotation relative to said housing; and a momentary contact switch arranged in said housing and actuatable by said pot-shaped guide element in response to movement of at least one of said dial or said inner part in the direction of said axis of rotation.

7. The operator control unit of claim 6, further comprising a plurality of operator control keys arranged radially around said rotary/pushbutton actuator.

8. A combination including an armrest of a vehicle seat having an extension and an operator control unit comprising a rotary/pushbutton actuator, wherein said rotary/pushbutton actuator comprises:

a housing;

a pot-shaped guide element arranged in said housing;

an annular rotary encoder having an inner ring and a rotary ring arranged in said pot-shaped guide element and defining an interior space, said rotary ring being rotatable about an axis of rotation and having a dial, said inner ring being arranged on said pot-shaped guide element so that said inner ring is fixed with respect to rotation relative to said pot-shaped guide element, said pot-shaped guide element and said annular rotary encoder being movable together linearly in a direction of said axis of rotation;

an inner part arranged in said interior space and movable with the annular rotary encoder in the direction of said axis of rotation relative to said housing; and a momentary contact switch arranged in said housing and actuatable by said pot-shaped guide element in response to movement of at least one of said dial or said inner part in the direction of said axis of rotation.

9. The operator control unit of claim 8, further comprising a plurality of operator control keys arranged radially around said rotary/pushbutton actuator.

* * * * *